US012673449B2

(12) United States Patent
Huang et al.

(10) Patent No.: US 12,673,449 B2
(45) Date of Patent: Jul. 7, 2026

(54) MULTI-TOW CARBON FIBER SPREADING AND PRE-IMPREGNATION SYSTEM

(71) Applicant: ZHENGZHOU UNIVERSITY, Zhengzhou (CN)

(72) Inventors: Ming Huang, Zhengzhou (CN); Yang Wang, Zhengzhou (CN); Chuntai Liu, Zhengzhou (CN); Na Zhang, Zhengzhou (CN); Jun Zhou, Zhengzhou (CN); Yunqiu Zu, Zhengzhou (CN); Xianzhang Shi, Zhengzhou (CN); Wei Wei, Zhengzhou (CN)

(73) Assignee: ZHENGZHOU UNIVERSITY, Zhengzhou (CN)

( * ) Notice: Subject to any disclaimer, the term of this patent is extended or adjusted under 35 U.S.C. 154(b) by 450 days.

(21) Appl. No.: 18/259,996

(22) PCT Filed: Sep. 8, 2022

(86) PCT No.: PCT/CN2022/117677
§ 371 (c)(1),
(2) Date: Jun. 29, 2023

(87) PCT Pub. No.: WO2023/116058
PCT Pub. Date: Jun. 29, 2023

(65) Prior Publication Data
US 2024/0375318 A1      Nov. 14, 2024

(30) Foreign Application Priority Data
Dec. 23, 2021      (CN) .......................... 202111588421.7

(51) Int. Cl.
*B29B 15/14*        (2006.01)
*B29B 15/12*        (2006.01)

(52) U.S. Cl.
CPC ............ *B29B 15/122* (2013.01); *B29B 15/14* (2013.01)

(58) Field of Classification Search
None
See application file for complete search history.

(56) References Cited

U.S. PATENT DOCUMENTS

2006/0137156 A1 *  6/2006  Kawabe ..................... D02J 1/18
                                                          28/271

FOREIGN PATENT DOCUMENTS

CN        101856872 A  * 10/2010  ........... B29B 15/122
CN        105904611 A  *  8/2016  ............. B29B 15/14
                (Continued)

OTHER PUBLICATIONS

Machine Translation of CN 108214980A.*

*Primary Examiner* — David P Turocy

(57) ABSTRACT

Provided is a multi-tow carbon fiber spreading and pre-impregnation system, which is used to solve the technical problems of large thickness, high porosity and the like of a prepreg tape product caused by low spread ratio and insufficient pre-impregnation in the production process of existing thermoplastic prepreg tapes. The system includes a filament release module, a filament doubling module, an airflow spreading module, a process deviation correction module, a traction module, a slurry impregnation module, an infrared melting module, a hot-pressing shaping module, a floating roller module, a cutting module, a leftover collecting module, a winding deviation correction module and a winding module which are sequentially arranged along a feeding direction. The filament release module includes at least two filament release assemblies, and carbon fibers are placed on the filament release assemblies.

12 Claims, 3 Drawing Sheets

(56) References Cited

FOREIGN PATENT DOCUMENTS

| CN | 106738448 | A | * | 5/2017 | ............. | B29B 15/14 |
| CN | 108214980 | A | * | 6/2018 | ............. | B29C 70/42 |
| CN | 109228413 | A | * | 1/2019 | ........... | B29C 70/528 |
| WO | WO-2019124203 | A1 | * | 6/2019 | ............... | B32B 5/26 |

* cited by examiner

MULTI-TOW CARBON FIBER SPREADING AND PRE-IMPREGNATION SYSTEM

CROSS-REFERENCE TO RELATED APPLICATION

This patent application with the PCT Application No. PCT/CN2022/117677 and Application date Sep. 8, 2022, claims the benefit and priority of Chinese Patent Application No. 202111588421.7, filed with the China National Intellectual Property Administration on Dec. 23, 2021, the disclosure of which is incorporated by reference herein in its entirety as part of the present application.

TECHNICAL FIELD

The present disclosure relates to the technical field of carbon fiber composites processing, in particular to a multi-tow carbon fiber spreading and pre-impregnation system.

BACKGROUND

As the key intermediate product of carbon fiber composite products, the processing technology and equipment of prepreg tapes have become the key issues in the industry.

In most of the common thermoplastic prepreg tape production equipment, a mechanical method is used to spread the fiber, and then a melting method is used to achieve the pre-impregnation of the carbon fiber. In the production process, the carbon fiber passes through the surfaces of multiple rollers, and the fiber is spread and thinned by using the friction between the fiber and the roller surface. Then the spread carbon fiber and thermoplastic polymer melt are extruded through a melting extrusion die at the same time, so as to achieve pre-impregnation of the carbon fiber by resin at high temperature and high pressure. The method has the advantages of simple process, high production efficiency and low equipment investment, but it is only suitable for general polymer materials with low viscosity such as polyethylene and polypropylene. For engineering plastics such as nylon, polyetheretherketone and special engineering plastics, it is difficult to realize effective pre-impregnation of carbon fiber by this method. The reason for such a problem is that, in the above method, the width of 12K carbon fiber is widened from 5 mm to 10-12 mm after being spread by the mechanical method, the spread ratio of the carbon fiber (the ratio of the spread width to the width of the original filament) generally does not increased, because the continuous increase of the spread ratio will increase the fiber damage rate and reduce the stability of the spreading process. In the pre-impregnation process, the high viscosity resin will cause secondary damage to the fiber and reduce the mechanical properties of the product.

Therefore, the thermoplastic carbon fiber prepreg tape produced by the above methods often has the problems of large product thickness and high porosity. In the process of achieving the lightweight of automobile parts by using prepreg tape layup and molding process, the thickness increase of the prepreg tape may reduce the designability of layup and limit the application of the prepreg tape. The increase of porosity may lead to the decline of anti-aging performance and mechanical properties of the products, and the reduction of the safety performance of parts.

SUMMARY

For the problems of large thickness and high porosity of prepreg tape products caused by low spread ratio and insufficient pre-impregnation in the production process of existing thermoplastic prepreg tapes, the present disclosure provides a multi-tow carbon fiber spreading and pre-impregnation system. According to the present disclosure, an airflow method is adopted to achieve non-damage spreading of the carbon fiber, and a powder slurry method is adopted to achieve full pre-impregnation of the spread carbon fiber by resin, thus producing a thin and high-performance thermoplastic carbon fiber prepreg tape. The designability of thermoplastic prepreg tape layup and the mechanical property of a thermoplastic composite product are improved.

To solve the above technical problems, the present disclosure adopts the following technical solution: a multi-tow carbon fiber spreading and pre-impregnation system includes a discharge mechanism, a spreading mechanism, an impregnation shaping mechanism, a cutting mechanism and a winding mechanism which are sequentially arranged along a feeding direction. The discharge mechanism includes a filament release module and a filament doubling module. The filament release module is located at the feed end of the filament doubling module, and includes at least two filament release assemblies, and carbon fibers are placed on the filament release assemblies.

The spreading mechanism includes an airflow spreading module, which is located at the discharge end of the filament doubling module.

The impregnation shaping mechanism includes a slurry impregnation module, an infrared melting module and a hot-pressing shaping module which are sequentially arranged along the feeding direction. A process deviation correction module and a traction module are arranged between the slurry impregnation module and the airflow spreading module, and the process deviation correction module is located at the feed end of the traction module.

The cutting mechanism includes a cutting module, and a floating roller module is arranged between the cutting module and the hot-pressing shaping module.

The winding mechanism includes a leftover collecting module and a winding module. Both the leftover collecting module and the winding module are located at the discharge end of the cutting module, and a winding deviation correction module is arranged between the winding module and the cutting module.

Compared with the prior art, an airflow method is adopted to achieve non-damage spreading of the carbon fiber, and a powder slurry method is adopted to achieve full pre-impregnation of the spread carbon fiber by the resin, thus producing a thin and high-performance thermoplastic carbon fiber prepreg tape to solve the problems of large thickness and high porosity of prepreg tape products caused by low spread ratio and insufficient pre-impregnation in the production process of existing thermoplastic prepreg tapes. Moreover, the designability of the thermoplastic prepreg tape layup and the mechanical property of the thermoplastic composite product are improved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
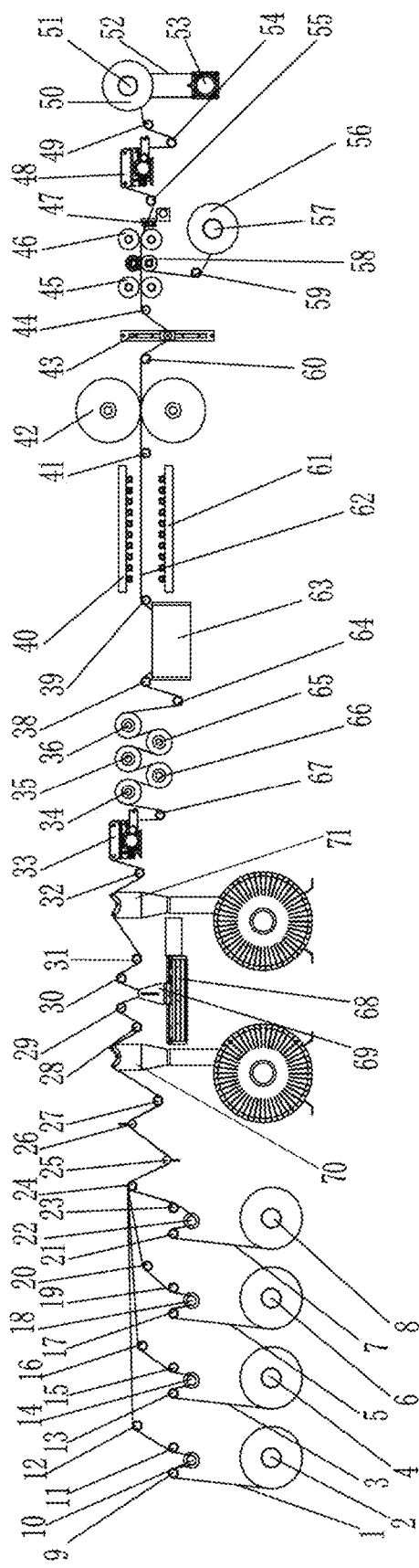
FIG. 1 is a schematic front view of a structure in accordance with the present disclosure.

In the drawings: 1—carbon fiber I; 2—unwinding air shaft I; 3—carbon fiber II; 4—unwinding air shaft II; 5—carbon fiber III; 6—unwinding air shaft III; 7—carbon fiber IV; 8—unwinding air shaft IV; 9—first unwinding guide shaft; 10—tension sensor I; 11—second unwinding guide shaft; 12—third unwinding guide shaft; 13—fourth unwinding guide shaft; 14—tension sensor II; 15—fifth unwinding guide shaft; 16—sixth unwinding guide shaft; 17—seventh unwinding guide shaft; 18—tension sensor III; 19—eighth unwinding guide shaft; 20—ninth unwinding guide shaft; 21—tenth unwinding guide shaft; 22—tension sensor IV; 23—eleventh unwinding guide shaft; 24—filament doubling guide shaft I; 25—filament splitting grid I; 26—filament splitting grid II; 27—filament doubling guide shaft II; 28—first spreading guide shaft; 29—second spreading guide shaft; 30—third spreading guide shaft; 31—fourth spreading guide shaft; 32—deviation correction guide shaft I; 33—photoelectric deviation correction module I; 34—traction roller I; 35—traction roller III; 36—traction roller V; 38—impregnation guide shaft II; 39—impregnation guide shaft III; 40—upper infrared heating assembly; 41—hot-pressing guide shaft; 42—precision hot-pressing roller set; 43—floating roller module; 44—positioning guide shaft II; 45—tensioning roller module I; 46—tensioning roller module II; 47—thickness sensor; 48—photoelectric deviation correction module II; 49—winding guide shaft II; 50—prepreg tape winding reel; 51—winding air shaft; 52—synchronous belt; 53—winding servo motor; 54—deviation correction guide shaft IV; 55—deviation correction guide shaft III; 56—leftover winding reel; 57—leftover winding air shaft; 58—cutting module; 59—winding guide shaft I; 60—positioning guide shaft I; 61—lower infrared heating assembly; 62—prepreg tape; 63—ultrasonic impregnation tank; 64—impregnation guide shaft I; 65—traction roller IV; 66—traction roller II; 67—deviation correction guide shaft II; 68—sliding module; 69—tension adjusting shaft mounting seat; 70—airflow spreading duct I; 71—airflow spreading duct II; 72—unwinding servo motor I; 73—unwinding servo motor II; 74—unwinding servo motor III; 75—unwinding servo motor IV; 76—first thin polished shaft; 77—second thin polished shaft; 78—third thin polished shaft; 79—tension adjusting shaft; 80—fourth thin polished shaft; 81—fifth thin polished shaft; 82—sixth thin polished shaft; 83—synchronous wheel; 84—rotating thin polished shaft III; 85—rotating thin polished shaft II; 86—rotating thin polished shaft I; 87—exhaust pipe II; 88—centrifugal fan II; 89—exhaust pipe I; 90—centrifugal fan I.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

As shown in FIG. 1, a multi-tow carbon fiber spreading and pre-impregnation system is provided, which includes a discharge mechanism, a spreading mechanism, an impregnation shaping mechanism, a cutting mechanism and a winding mechanism which are sequentially arranged along a feeding direction. The discharge mechanism includes a filament release module and a filament doubling module. The filament release module is located at the feed end of the filament doubling module. The spreading mechanism includes an airflow spreading module, and the airflow spreading module is located at the discharge end of the filament doubling module. The impregnation shaping mechanism includes a slurry impregnation module, an infrared melting module and a hot-pressing shaping module which are sequentially arranged along a feeding direction. A process deviation correction module and a traction module are arranged between the slurry impregnation module and the airflow spreading module, and the process deviation correction module is located at the feed end of the traction module. The cutting mechanism includes a cutting module, and a floating roller module is arranged between the cutting module and the hot-pressing shaping module. The winding mechanism includes a leftover collecting module and a winding module, both the leftover collecting module and the winding module are located at the discharge end of the cutting module, and a winding deviation correcting module is arranged between the winding module and the cutting module.

Specifically, the filament release module includes at least two filament release assemblies, and carbon fibers are placed on the filament release assemblies. In this embodiment, the number of the filament release assemblies is four, the filament releasing assemblies each include an unwinding air shaft, i.e., an unwinding air shaft I 2, an unwinding air shaft II 4, an unwinding air shaft II 6 and an unwinding air shaft IV 8. The corresponding carbon fibers are carbon fiber I 1, carbon fiber II 3, carbon fiber III 5 and carbon fiber IV 7, and the four rolls of carbon fibers are respectively placed on the corresponding four unwinding air shafts. The unwinding air shaft is connected to an unwinding servo motor by a coupling. Specifically, the unwinding air shaft I 2 is connected to an unwinding servo motor I 72 by a coupling, the unwinding air shaft II 4 is connected to an unwinding servo motor II 73 by a coupling, the unwinding air shaft III 6 is connected to an unwinding servo motor III 74 by a coupling, and the unwinding air shaft IV 8 is connected to an unwinding servo motor IV 75 by a coupling. The unwinding servo motors are configured to drive the connected unwinding air shafts to rotate, so as to drive the carbon fiber to unwind for filament release.

In order to ensure the tension stability in the unwinding of the carbon fiber, the servo motor and a tension sensor are used for unwinding in cooperation. That is, the tension sensors are arranged above the unwinding air shafts, which are a tension sensor I 10, a tension sensor II 14, a tension sensor III 18 and a tension sensor IV 22, respectively. Each of the four tension sensors includes a tension detection roller for detecting a tension value of the carbon fiber. In order to further ensure the tension stability in the unwinding of the carbon fiber, the four tension sensors are equipped with tension controllers, respectively, the tension controllers can be configured to set the target tension and receive carbon fiber tension signals detected by the corresponding tension detection rollers. The unwinding servo motor and the tension sensor are respectively connected to the corresponding tension controller. The tension sensor is configured to detect the tension change of the corresponding tow carbon fibers when unwinding, and feed a signal back to the corresponding tension controller, and the tension controller is configured to receive the signal and then feed the signal back to the corresponding unwinding servo motor. The unwinding servo motor is configured to control an output torque according to the detected tension signal, and then to control the unwinding tension to be stabilized at the target tension, so as to achieve the purpose of unwinding at the constant tension. In addition, the number of the unwinding air shafts, the unwinding servo motors, the tension sensors and other components can be adjusted according to the actual production efficiency requirements.

Further, both sides of each tension sensor are provided with unwinding guide shafts in fit with the carbon fiber. Specifically, both sides of the tension sensor I 10 are respectively provided with a first unwinding guide shaft 9 and a second unwinding guide shaft 11, and the carbon fiber I 1 is introduced into the filament doubling module through the third unwinding guide shaft 12 under the guidance of the first unwinding guide shaft 9 and the second unwinding guide shaft 11. Both sides of the tension sensor II 14 are respectively provided with a fourth unwinding guide shaft 13 and a fifth unwinding guide shaft 15, and the carbon fiber II 3 is introduced into the filament doubling module through the sixth unwinding guide shaft 16 under the guidance of the fourth unwinding guide shaft 13 and the fifth unwinding guide shaft 15. Both sides of the tension sensor III 18 are respectively provided with a seventh unwinding guide shaft 17 and an eighth unwinding guide shaft 19, and the carbon fiber III 5 is introduced into the filament doubling module through the ninth unwinding guide shaft 20 under the guidance of the seventh unwinding guide shaft 17 and the eighth unwinding guide shaft 19. Both sides of the tension sensor IV 22 are respectively provided with a tenth unwinding guide shaft 21 and an eleventh unwinding guide shaft 23, and the carbon fiber IV 7 is introduced into the filament doubling module under the guidance of the tenth unwinding guide shaft 21 and the eleventh unwinding guide shaft 23.

The filament doubling module includes a filament doubling guide shaft I 24, a filament splitting grid I 25, a filament splitting grid II 26 and a filament doubling guide shaft II 27. The filament doubling guide shaft I 24, the filament splitting grid I 25, the filament splitting grid II 26 and the filament doubling guide shaft II 27 are arranged in a W-shaped structure along the feeding direction and are all in fit with the carbon fiber. In order to achieve doubling of multiple bundles of carbon fibers, four groups of carbon fibers enter the filament splitting grid I 25 and the splitting grid II 26 in turn after being doubled by the doubling guide shaft I 24. The filament splitting grid consists of multiple thin polished shafts arranged on a transverse fixed shaft at a fixed interval, and the interval between the thin polished shafts can be adjusted according to the actual demand. After passing through the filament splitting grids, the carbon fibers can be arranged equidistant and ordered evenly, so as to ensure the stability of the fibers running track. In order to further achieve the doubling of multiple bundles of carbon fibers, the interval between the thin polished shafts on the filament splitting grid I 25 and the filament splitting grid II 26 can be adjusted according to tow type, fiber spread ratio and other parameters. Finally, the carbon fibers are introduced into the airflow spreading module under the guidance of the filament doubling guide shaft II 27.

Figure 2:
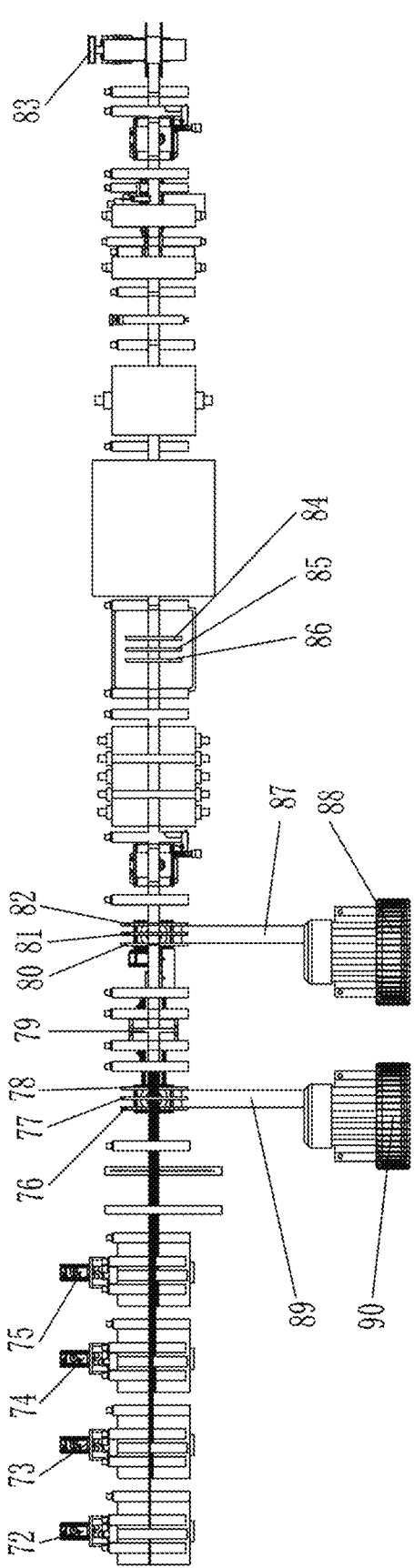
FIG. 2 is a schematic top view of a structure in accordance with the present disclosure.

As a further preferred scheme, an airflow method is adopted in this embodiment to achieve uniform spreading of the carbon fiber to achieve non-damage and efficient spreading of the carbon fiber tows. As shown in FIG. 2, the airflow spreading module includes two airflow spreading assemblies, the two airflow spreading assemblies include a centrifugal fan I 90 and a centrifugal fan II 88, respectively. That is, a variable-frequency centrifugal fan is used to provide airflow; and the power of the fan is adjustable to achieve steady increase of airflow and prevent sudden change of the airflow from damaging the fiber. The centrifugal fan I 90 communicates with an exhaust pipe I 89, and the exhaust pipe I 89 communicates with the bottom of an airflow spreading duct I 70, and the top of the airflow spreading duct I 70 is provided with three polished shafts arranged side by side, e.g., a first thin polished shaft 76, a second thin polished shaft 77 and a third thin polished shaft 78. The centrifugal fan II 88 communicates with the exhaust pipe II 87, the exhaust pipe II 87 communicates with the bottom of an airflow spreading duct II 71, and the top of the airflow spreading duct II 71 is provided with three polished shafts arranged side by side, e.g., a fourth thin polished shaft 80, a fifth thin polished shaft 81, and a sixth thin polished shaft 82. After the centrifugal fan is started, a stable airflow can be formed in the corresponding airflow spreading duct, and the carbon fiber can be spread without contact under the action of the airflow. The carbon fiber passes through the airflow spreading duct I 70 and the airflow spreading duct II 71 in turn to achieve fiber spreading and thinning, and then the spread carbon fiber enters the process deviation correction module.

In order to further achieve the non-damage and high-efficiency spreading of the carbon fiber tow, a sliding module 68 is arranged between the two airflow spreading assemblies, and the sliding module is mainly composed of a servo motor, a ball screw, a sliding guide rail and a sliding platform. The servo motor is connected to the ball screw by a coupling, the ball screw is connected to the sliding platform by a lead screw support, and the sliding platform is mounted on the sliding guide rail. The servo motor operates to drive the ball screw to rotate, and the lead screw rotates to drive the sliding platform to move along the sliding guide rail. A tension adjusting shaft mounting seat 69 is arranged on the sliding platform of the sliding module 68, and a tension adjusting shaft 79 is arranged on the tension adjusting shaft mounting seat 69. The sliding module can drive the tension adjusting shaft to reciprocate, and the carbon fiber may show a relaxed state at a certain moment, which can enlarge the spreading effect of the airflow on the carbon fiber and increase the spreading efficiency. The upper left side of the tension adjusting shaft 79 is provided with a first spreading guide shaft 28 and a second spreading guide shaft 29, respectively, and the upper right side of the tension adjusting shaft 79 is provided with a third spreading guide shaft 30 and a fourth spreading guide shaft 31, respectively. The first spreading guide shaft 28, the second spreading guide shaft 29, the tension adjusting shaft 79, the third spreading guide shaft 30 and the fourth spreading guide shaft 31 are arranged in an M-shaped structure along the feeding direction.

The process deviation correction module includes a photoelectric deviation correction module I 33, the photoelectric deviation correction module I is mainly composed of a guide shaft, a guide shaft mounting seat, a servo motor, and a photoelectric sensor. The carbon fiber passes through the guide shaft, and the photoelectric sensor is arranged on one side of the guide shaft and configured to detect a carbon fiber position signal. The guide shaft is mounted on the guide shaft mounting seat, and the bottom of the guide shaft mounting seat is connected to an output shaft of the servo motor through a connecting rod. The photoelectric sensor is configured to detect the carbon fiber position signal and feed the signal back to the servo motor. The servo motor operates to drive the guide shaft to rotate horizontally, thus achieving the correction of the running track of the spread carbon fiber. The photoelectric correction module I 33 is used to perform process deviation correction on the spread carbon fiber, thus ensuring the running track stability of the fiber. Both sides of the photoelectric deviation correction module I 33 are respectively provided with a deviation correction guide shaft I 32 and a deviation correction guide shaft II 67 in fit with the carbon fiber, both of the deviation correction guide shaft I 32 and the deviation correction guide shaft II 67 play a guiding role, and the spread carbon fiber is introduced into the traction module through the deviation correction guide shaft II 67.

In order to further ensure the stability of the carbon fiber spreading and pre-impregnation process, the traction module adopts a five-axis traction roller set, the five-axis traction roller set includes a traction roller I 34, a traction roller II 66, a traction roller III 35, a traction roller IV 65 and a traction roller V 36. The traction roller I 34, the traction roller II 66, the traction roller III 35, the traction roller IV 65 and the traction roller V 36 are arranged in a W-shaped structure along the feeding direction and are all in fit with the carbon fiber. That is, under the traction of the five-axis traction roller set, the spread carbon fiber moves to enter the slurry impregnation module, and the speed of the five-axis traction module is adjustable, and the linear speed can be kept constant, thus ensuring the stability of the carbon fiber spreading process. Five-axis traction is provided to avoid fiber damage caused by small contact surface and excessive pressure of the roller traction mechanism. The linear speed of five-axis traction is stable, thus ensuring the constant linear speed in the carbon fiber filament releasing and spreading process and avoiding uneven spreading caused by speed change.

The slurry impregnation module includes an ultrasonic impregnation tank 63, and the ultrasonic impregnation tank 63 is filled with special suspension prepared from thermoplastic resin powder. In addition, ultrasonic generators are mounted around the ultrasonic impregnation tank, i.e., ultrasonic vibrators are distributed at the bottom of the ultrasonic impregnation tank, with the ultrasonic frequency from 10 MHz to 100 MHz. When the ultrasonic generator is started, energy can be transmitted to vibrate the suspension in the tank to avoid uneven distribution of resin caused by natural sedimentation of particles and achieve uniform pre-impregnation of the carbon fiber. Three rotating thin polished shafts in fit with the carbon fibers are arranged side by side at the bottom of the ultrasonic impregnation tank 63, which are a rotating thin polished shaft I 86, a rotating thin polished shaft II 85, and a rotating thin polished shaft III 84, respectively, and the positions of the three rotating thin polished shafts can be adjusted up and down, left and right. The residence time of the carbon fiber in the ultrasonic impregnation tank can be controlled by moving the rotating thin polished shafts, so as to improve the impregnation effect of the resin powder on the carbon fiber. In this embodiment, the powder slurry method is adopted to achieve the impregnation of the carbon fiber spread yarn, and under the ultrasonic vibration, the resin fine powder is uniformly attached to the inner and outer surfaces of the carbon fiber after the carbon fiber is impregnated in the resin fine powder suspension.

Further, an impregnation guide shaft II 38 and an impregnation guide shaft III 39 are respectively arranged at the inlet and outlet of the ultrasonic impregnation tank 63. An impregnation guide shaft I 64 is also provided between the impregnation guide shaft II 38 and the traction roller V 36. The impregnation guide shaft II 38, the impregnation guide shaft III 39 and the impregnation guide shaft I 64 all play a guiding role on the carbon fiber, and the impregnated carbon fiber is introduced into an infrared melting module under the action of the impregnation guide shaft III 39.

The infrared melting module includes an upper infrared heating assembly 40 and a lower infrared heating assembly 61 which are correspondingly arranged up and down, the upper infrared heating assembly 40 and the lower infrared heating assembly 61 are internally provided with medium-long wave infrared heating tubes, and the power is controlled by a thyristor. As the polymer resin powder has higher adsorption to the medium-long wave infrared rays, the carbon fiber impregnated with resin suspension can be melted quickly when passing through the infrared heating tubes, thus achieving the preliminary pre-impregnation of the carbon fiber. Medium-long wave infrared lamp tubes are used to heat the impregnated carbon fiber, so as to achieve the efficient heating of the thermoplastic polymer resin on the surface of the carbon fiber. The impregnated carbon fiber with fine resin powder on its surface is heated and dried by the medium-long wave infrared heating tubes. After drying, the resin powder is fixed to the carbon fiber to initially form a prepreg tape 62, and then the prepreg tape 62 enters a hot-pressing shaping module.

In order to further achieve the uniform pre-impregnation of the carbon fiber, the hot-pressing shaping module adopts a precision hot-pressing roller set 42, which includes an upper hot-pressing roller and a lower hot-pressing roller corresponding to each other. Electric heating rods are used by the upper hot-pressing roller and the lower hot-pressing roller for heating, and the temperature is precisely adjusted by a temperature controller. A clearance between the upper hot-pressing roller and the lower hot-pressing roller can be adjusted by a wedge-shaped block between the rollers. A hot-pressing guide shaft 41 is arranged at the feed end of the precision hot-pressing roller set 42, and the prepreg tape 62 formed initially enters the precision hot-pressing roller set 42 under the guidance of the hot-pressing guide shaft 41 for hot-pressing shaping, so that the resin and the carbon fiber are fully combined to achieve good pre-impregnation, and a thermoplastic prepreg tape 62 with uniform thickness is obtained.

In order to further characterize the resin impregnation condition of the prepreg tape prepared by the present disclosure, the surface of the prepreg tape was observed by a ultra-depth microscope. A prepreg tape prepared according to the present disclosure show s that the fibers are still arranged neatly after being pre-impregnated by the resin, the resin distribution on the fiber surface is basically uniform, and there is no obvious resin-rich area, which indicates that the resin is uniformly and fully pre-impregnated on the fiber filaments, and there is no phenomenon such as broken filaments and winding of the fibers during the impregnation process. The prepreg tape prepared by a conventional laminating method (usually used for the preparation of a glass fiber prepreg tape) shows that the resin on the surface of the prepreg tape is obviously enriched, and the fibers are arranged irregularly, the broken-filaments of the fibers may have the phenomenon of cross distribution and winding. Therefore, the prepreg tape prepared according to the present disclosure is obviously superior.

Figure 3:
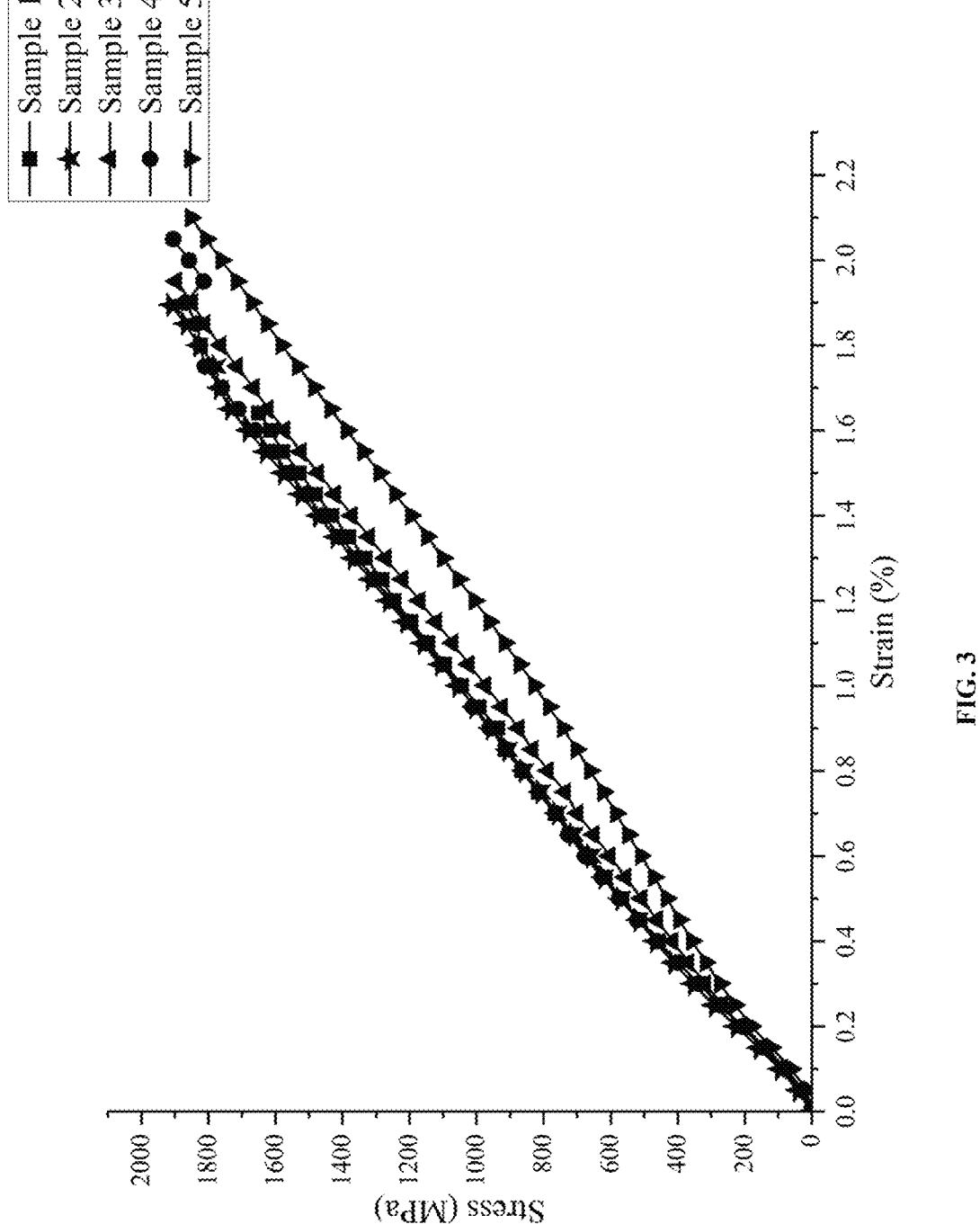
FIG. 3 is a tensile stress-strain diagram of 0-degree layup of a prepreg tape prepared according to the present disclosure.

FIG. 3 shows the prepreg tape prepared according to the present disclosure, which is made into a plate by 0-degree layup and hot pressing. According to a stress-strain curve tested based on GB/T3354-2014, it can be seen from FIG. 3 that the average tensile strength and average tensile modulus of the prepreg tape prepared according to the present disclosure have reached 1.85 GPa and 93 GPa respectively, and the performance of the unidirectional tape is excellent.

The resulting prepreg tape 62 then is fed into the floating roller module. The floating roller module includes a floating roller module 43, which is mainly composed of a floating roller, a mounting seat, a slider and a linear slide rail. One end of the floating roller is mounted on the mounting seat by a bearing, the mounting seat is fixedly connected to the slider, and the slider is mounted on the linear slide rail. The floating roller can move along the linear slide rail to achieve the tension adjustment function of the prepreg tape in the winding section. The floating roller module 43 is adopted to alleviate the speed mismatch problem among the five-axis traction roller (the traction rollers 34, 66, 35, 65 and 36), the tensioning roller module I 45 and the tensioning roller module II 46 that may exist in the winding process. When the speed of the five-axis traction roller is greater than that of the tensioning roller, the floating roller descends to keep the fiber tensioned, and the tensioning roller module group may increase an output to make the floating roller return to an original position, thus making the tension in the winding process stable. Further, both sides of the floating roller module 43 are symmetrically provided with a positioning guide shaft I 60 and a positioning guide shaft II 44 in fit with the prepreg tape 62, and the positioning guide shaft I 60 and the positioning guide shaft II 44 plays a role in guiding and positioning. After the tension is adjusted by the floating roller module 43, the prepreg tape 62 enters the cutting module.

In order to facilitate the winding of the carbon fiber prepreg tape, the prepreg tape is subjected to cutting and fixed-width treatment by the cutting module before winding. The cutting module includes a cutting module 58 for cutting the prepreg tape 62, the cutting module 58 is composed of an upper hob assembly, a lower hob assembly, a mounting shaft, and a mounting seat. The upper hob assembly is mainly composed of an annular hob blade, a hob blade fixing ring and a mounting shaft. The annular hob blade is mounted on the hob blade fixing ring by a screw, and the hob blade fixing ring is sleeved outside the mounting shaft and fixed by a top wire. The lower hob assembly is mainly composed of a mounting shaft and a clearance ring. The clearance ring is sleeved outside the mounting shaft and fixed by a top wire. The clearance ring is machined with an annular clearance which is in fit with the size of the annular hob blade of the upper hob assembly. The clearance ring and the annular hob of the upper hob assembly form the cutting module together. The spacing distance between the upper hob assembly and the lower hob assembly can be adjusted by making the upper hob assembly and the lower hob assembly move on the mounting shaft, so as to adjust the cutting width. In order to facilitate the cutting of the carbon fiber prepreg tape, both sides of the cutting module 58 are respectively provided with a tensioning roller module I 45 and a tensioning roller module II 46, which can be configured to tension the prepreg tape so as to facilitate the cutting and prevent the tape from deviating during the cutting process. There is a certain speed difference between the tensioning roller module I 45 and the tensioning roller module II 46, which can ensure the position stability and tension stability in the cutting process of the prepreg tape, so as to facilitate cutting. The leftovers obtained after cutting are collected by the leftover collecting module.

The leftover collecting module includes a leftover winding reel 56, the leftover winding reel 56 is mounted on a leftover winding air shaft 57, and the leftover winding air shaft 57 is driven by a torque motor to ensure winding tension stability. A winding guide shaft I 59 is arranged at the feed end of the leftover winding reel 56, and the leftovers obtained after cutting is wound on the leftover winding reel 56 under the guidance of the winding guide shaft I 59.

A thickness sensor 47 is arranged at the discharge end of the tensioning roller module II 46, and the thickness of the prepreg tape after width fixation is detected by the thickness sensor 47 and is fed back in time, so as to adjust the process parameters in time. Subsequently, the prepreg tape enters the winding deviation correction module.

The winding deviation correction module includes a photoelectric deviation correction module II 48, the photoelectric deviation correction module II 48 includes a photoelectric sensor, which can be configured to detect and correct the running track of the carbon fiber in real time, the constant position of the prepreg tape in a winding reel is guaranteed to facilitate the winding stability and the winding failure problem caused by the position deviation of the prepreg tape is avoided. The photoelectric deviation correction module II is mainly composed of a guide shaft, a guide shaft mounting seat, a servo motor, and a photoelectric sensor. The carbon fiber passes through the guide shaft, and the photoelectric sensor is arranged on one side of the guide shaft and configured to detect a carbon fiber position signal. The guide shaft is mounted on the guide shaft mounting seat, and the bottom of the guide shaft mounting seat is connected to an output shaft of the servo motor through a connecting rod. The photoelectric sensor is configured to detect the carbon fiber position signal and feed the signal back to the servo motor. The servo motor operates to drive the guide shaft to rotate horizontally, thus achieving the correction of the running track of the spread carbon fiber. Both sides of the photoelectric deflection correction module II 48 are respectively provided with a deviation correction guide shaft III 55 and a deviation correction guide shaft IV 54 which are in fit with the prepreg tape 62, and the prepreg tape 62 enters the winding module under the guidance of the deviation correction guide shaft IV 54.

The winding module includes a prepreg tape winding reel 50, the prepreg tape winding reel 50) is mounted on a winding air shaft 51, and the winding air shaft 51 is connected to a winding servo motor 53 through a transmission assembly. The transmission assembly includes a synchronous belt 52 and a synchronous wheel 83. One end of the synchronous belt 52 is connected to the prepreg tape winding reel 50, and the other end of the synchronous belt 52 is connected to the synchronous wheel 83. The synchronous wheel 83 is connected to an output shaft of the winding servo motor 53. The winding servo motor 53 is configured to drive the winding air shaft 51 to rotate through the synchronous wheel 83 and the synchronous belt 52 in turn, thereby driving the prepreg tape winding reel 50 to rotate to achieve winding. A winding guide shaft II 49 is arranged at the feed end of the prepreg tape winding reel 50, and the prepreg tape 62 after deviation correction is wound on the prepreg tape winding reel 50 under the guidance of the winding guide shaft II 49. The winding servo motor 53 can perform winding in a torque mode to ensure winding tension stability.

After being unwound on the corresponding unwinding air shaft, the carbon fiber roll passes through the tension sensor via the guide shaft, and the tension sensor can be configured to detect a tension value of the carbon fibers and control an output of the unwinding servo motor according to a target tension value, thus achieving the purpose of unwinding at the constant tension. The carbon fibers are uniformly arranged after passing through the filament splitting grid, and then the fibers are spread and thinned through the airflow spreading duct. Afterwards, the spread carbon fibers are subjected to deviation correction by the photoelectric deviation correction module I and enter the ultrasonic impregnation tank under the traction of the five-axis traction roller. The ultrasonic impregnation tank is filled with resin fine powder suspension, and under the ultrasonic vibration, the resin fine powder is uniformly distributed on the inner and outer surfaces of the carbon fibers, and the impregnated carbon fibers are dried by the upper infrared heating assembly and the lower infrared heating assembly, after drying, the resin powder is fixed to the carbon fibers, and then the carbon fibers are hot-pressed and shaped by the precision hot-pressing roller set to obtain a thermoplastic prepreg tape with a uniform thickness. After the tension of the prepreg tape is adjusted through the floating roller module, the cutting module is configured to perform cutting and fixed-width treatment on the prepreg tape according to actual demands, the edge and determines the width of the prepreg tape according to the actual demand, the cut leftovers are collected by the leftover winding reel, the prepreg tape after width fixation is subjected to thickness detection by the thickness sensor, then is subjected to deviation correction by the photoelectric deviation correction module II, and finally is wound by the prepreg tape winding reel.

The above description is only a preferred embodiment of the present disclosure and is not intended to limit the present disclosure. Any modification, equivalent replacement, improvement, etc. made within the spirit and principles of the present disclosure should be included within the scope of protection of the present disclosure.

What is claimed is:

1. A multi-tow carbon fiber spreading and pre-impregnation system, comprising a discharge mechanism, a spreading mechanism, an impregnation shaping mechanism, a cutting mechanism and a winding mechanism which are sequentially arranged along a feeding direction, wherein the discharge mechanism comprises a filament release module and a filament doubling module; and the filament release module is located at a feed end of the filament doubling module, and comprises at least two filament release assemblies, on which carbon fibers are placed;

the spreading mechanism comprises an airflow spreading module, which is located at a discharge end of the filament doubling module;

the impregnation shaping mechanism comprises a slurry impregnation module, an infrared melting module and a hot-pressing shaping module which are sequentially arranged along the feeding direction; a process deviation correction module and a traction module are arranged between the slurry impregnation module and the airflow spreading module, and the process deviation correction module is located at a feed end of the traction module;

the cutting mechanism comprises a cutting module, and a floating roller module is arranged between the cutting module and the hot-pressing shaping module;

the winding mechanism comprises a leftover collecting module and a winding module, wherein both the leftover collecting module and the winding module are located at a discharge end of the cutting module, and a winding deviation correction module is arranged between the winding module and the cutting module;

wherein the airflow spreading module comprises two airflow spreading assemblies, a sliding module (68) is arranged between the two airflow spreading assemblies, a tension adjusting shaft mounting seat (69) is slidingly arranged on the sliding module (68), a tension adjusting shaft (79) is arranged on the tension adjusting shaft mounting seat (69), and spreading guide shafts are arranged on two upper sides of the tension adjusting shaft (79); each airflow spreading assembly comprises a centrifugal fan, the centrifugal fan communicates with an exhaust pipe, the exhaust pipe communicates with a bottom of an airflow spreading duct, and a top of the airflow spreading duct is provided with three polished shafts arranged side by side.

2. The multi-tow carbon fiber spreading and pre-impregnation system according to claim 1, wherein each filament release assembly in the filament release module comprises an unwinding air shaft, the carbon fiber is placed on the unwinding air shaft, and the unwinding air shaft is connected to an unwinding servo motor by a coupling; a tension sensor is arranged above the unwinding air shaft, and the unwinding servo motor and the tension sensor are both connected to a tension controller; two sides of the tension sensor are both provided with unwinding guide shafts; the filament doubling module comprises a filament doubling guide shaft I (24), a filament splitting grid I (25), a filament splitting grid II (26), and a filament doubling guide shaft II (27); the filament doubling guide shaft I (24), the filament splitting grid I (25), the filament splitting grid II (26) and the filament doubling guide shaft (27) are arranged in a W-shaped structure in the feeding direction.

3. The multi-tow carbon fiber spreading and pre-impregnation system according to claim 1, wherein the process deviation correction module comprises a photoelectric deviation correction module I (33), and two sides of the photoelectric deviation correction module I (33) are respectively provided with a deviation correction guide shaft I (32) and a deviation correction guide shaft II (67); the traction module adopts a five-axis traction roller set, which comprises a traction roller I (34), a traction roller II (66), a traction roller III (35), a traction roller IV (65), and a traction roller V (36); the traction roller I (34), the traction roller II (66), the traction roller III (35), the traction roller IV (65) and the traction roller V (36) are arranged in a W-shaped structure along the feeding direction.

4. The multi-tow carbon fiber spreading and pre-impregnation system according to claim 3, wherein the slurry impregnation module comprises an ultrasonic impregnation tank (63), the ultrasonic impregnation tank (63) is filled with resin powder suspension, three rotating polished shafts are arranged side by side at a bottom of the ultrasonic impregnation tank (63), and resin powder is attached to the inner and outer surfaces of the carbon fiber after the carbon fiber is impregnated in the resin powder suspension under the guidance of the three rotating polished shafts; two sides of the ultrasonic impregnation tank (63) are respectively provided with an impregnation guide shaft II (38) and an impregnation guide shaft III (39), and an impregnation guide shaft I (64) is also arranged between the impregnation guide shaft II (38) and the traction roller V (36).

5. The multi-tow carbon fiber spreading and pre-impregnation system according to claim 4, wherein the infrared melting module comprises an upper infrared heating assembly (40) and a lower infrared heating assembly (61) which are correspondingly arranged up and down; the upper infrared heating assembly (40) and the lower infrared heating assembly (61) are both internally provided with medium-long wave infrared heating tubes; and the carbon fiber attached with the resin powder forms a prepreg tape (62) after being heated by the medium-long wave infrared heating tubes; the hot-pressing shaping module adopts a precision hot-pressing roller set (42), wherein the precision hot-pressing roller set (42) comprises an upper hot-pressing roller and a lower hot-pressing roller which are correspondingly arranged up and down, and a hot-pressing guide shaft (41) is arranged at the feed end of the precision hot-pressing roller set (42)).

6. The multi-tow carbon fiber spreading and pre-impregnation system according to claim 5, wherein the cutting module comprises a cutting module (58) for cutting the prepreg tape (62), and two sides of the cutting module (58) are provided with a tensioning roller module I (45) and a tensioning roller module II (46), respectively; a thickness sensor (47) is arranged at a discharge end of the tensioning roller module II (46).

7. The multi-tow carbon fiber spreading and pre-impregnation system according to claim 5, wherein the leftover collecting module comprises a leftover winding air shaft, a leftover winding reel (56) is mounted on the leftover winding air shaft (57), and a winding guide shaft (59) is arranged at a feed end of the leftover winding reel (56).

8. The multi-tow carbon fiber spreading and pre-impregnation system according to claim 5, wherein the floating roller module comprises a floating roller module (43), and two sides of the floating roller module (43) are respectively provided with a positioning guide shaft I (60) and a positioning guide shaft II (44); the winding deviation correction module comprises a photoelectric deviation correction module II (48), and two sides of the photoelectric deviation correction module II (48) are respectively provided with a deviation correction guide shaft III (55) and a deviation correction guide shaft IV (54).

9. The multi-tow carbon fiber spreading and pre-impregnation system according to claim 5, wherein the leftover collecting module comprises a leftover winding air shaft, a leftover winding reel (56) is mounted on the leftover winding air shaft (57), and a winding guide shaft (59) is arranged at a feed end of the leftover winding reel (56).

10. The multi-tow carbon fiber spreading and pre-impregnation system according to claim 9, wherein the winding module comprises a prepreg tape winding reel (50), the prepreg tape winding reel (50) is mounted on a winding air shaft (51), and the winding air shaft (51) is connected to a winding servo motor (53) through a transmission assembly; a winding guide shaft II (49) is arranged at a feed end of the prepreg tape winding reel (50).

11. The multi-tow carbon fiber spreading and pre-impregnation system according to claim 10, wherein the floating roller module comprises a floating roller module (43), and two sides of the floating roller module (43) are respectively provided with a positioning guide shaft I (60) and a positioning guide shaft II (44); the winding deviation correction module comprises a photoelectric deviation correction module II (48), and two sides of the photoelectric deviation correction module II (48) are respectively provided with a deviation correction guide shaft III (55) and a deviation correction guide shaft IV (54).

12. The multi-tow carbon fiber spreading and pre-impregnation system according to claim 5, wherein the floating roller module comprises a floating roller module (43), and two sides of the floating roller module (43) are respectively provided with a positioning guide shaft I (60) and a positioning guide shaft II (44); the winding deviation correction module comprises a photoelectric deviation correction module II (48), and two sides of the photoelectric deviation correction module II (48) are respectively provided with a deviation correction guide shaft III (55) and a deviation correction guide shaft IV (54).

* * * * *